Sept. 26, 1933.   J. W. SWARFVAR   1,928,322
MECHANISM FOR CUTTING A LOOSE PACKING MATERIAL
Filed May 20, 1931    2 Sheets-Sheet 1

INVENTOR
John Walter Swarfvar
BY
G. Wright Arnold
ATTORNEY

Sept. 26, 1933.    J. W. SWARFVAR    1,928,322
MECHANISM FOR CUTTING A LOOSE PACKING MATERIAL
Filed May 20, 1931    2 Sheets-Sheet 2

INVENTOR
John Walter Swarfvar
BY
ATTORNEY

Patented Sept. 26, 1933

1,928,322

UNITED STATES PATENT OFFICE 1,928,322

MECHANISM FOR CUTTING A LOOSE PACKING MATERIAL

John Walter Swarfvar, Seattle, Wash.

Application May 20, 1931. Serial No. 538,744

4 Claims. (Cl. 164—50)

My invention relates to a process for making a loose packing material, a cutting machine and shredding machine for forming a plurality of curved cut strips and the product thereof.

More particularly, my invention relates to a mechanism for cutting and shredding a plurality of layers of sheet material, such as complete newspapers and the like, into strips of such shape that the product will not pack tightly together but will be of such varying shapes that the cushioning effect of a pile of the product will be greatly increased and the individual parts of the product will be characterized by their tendency to separate from each other and to pile loosely.

Heretofore, in the cutting of paper excelsior and similar products from sheet materials where a product is desired to be in narrow strips and to be thereafter piled together in such a manner that a resiliency and cushioning effect was obtained, straight strips of the desired width have been cut. Thereafter these strips have been separated by falling to a pile below the machine and thereby an attempt was made to separate the cut strips in a haphazardly stacked pile. However, as the strips were uniformly cut and were delivered from the machine at right angles to the cutter heads, the product fell below the machine in a compact pile and only a part of the mass of strips were separated. The tendency of such strips to hang together and not separate was greatly exaggerated in the event that the raw material delivered to the machine was in a great plurality of layers, as for example, the feeding of an ordinary sized Sunday newspaper of today. In such event, the cutter heads delivered a thick mass of strips compressed tightly together, which would fall in a compact mass without separating as to produce a valuable excelsior.

Cutter heads with cutting knives having beveled or square cutting edges together with cutting discs in the form of screw threads on parallel rolls are well known and have been long used in the art and in allied arts. These devices have failed to solve the problem and a keen felt, long desired want has existed in the art for means of cutting a plurality of sheets of material, with the sheets superimposed upon each other, in such manner that the product will fall in a loose haphazard pile which will be able to maintain such looseness so that the product can be used as the packing material for other articles or so that the product is valuable where loose packing of the product to use the same is desirable.

My invention overcomes the prior objections found in the art and the product of the machine, for example, paper excelsior, is formed of a series of arcuate shaped members, no one of which series has the same degree of curvature. The arcuate shaped members when delivered from the machine will flutter and turn, due to their arcuate shape, and fall to a pile in a haphazard manner in a pile below the machine. After the strips are piled and are being used as loose packing material, the members being of different shape, they will not pack along side of each other and thereby a great number of spaces between the members are formed in the pile and all the advantages of a loose packing excelsior long wanted in the art are realized.

The above mentioned general objects of my invention, together with others inherent in the same, are attained by the mechanism and product illustrated in the following drawings, the same being preferred exemplary forms of embodiment of my invention, throughout which drawings like reference numerals indicate like parts:

Figure 1:
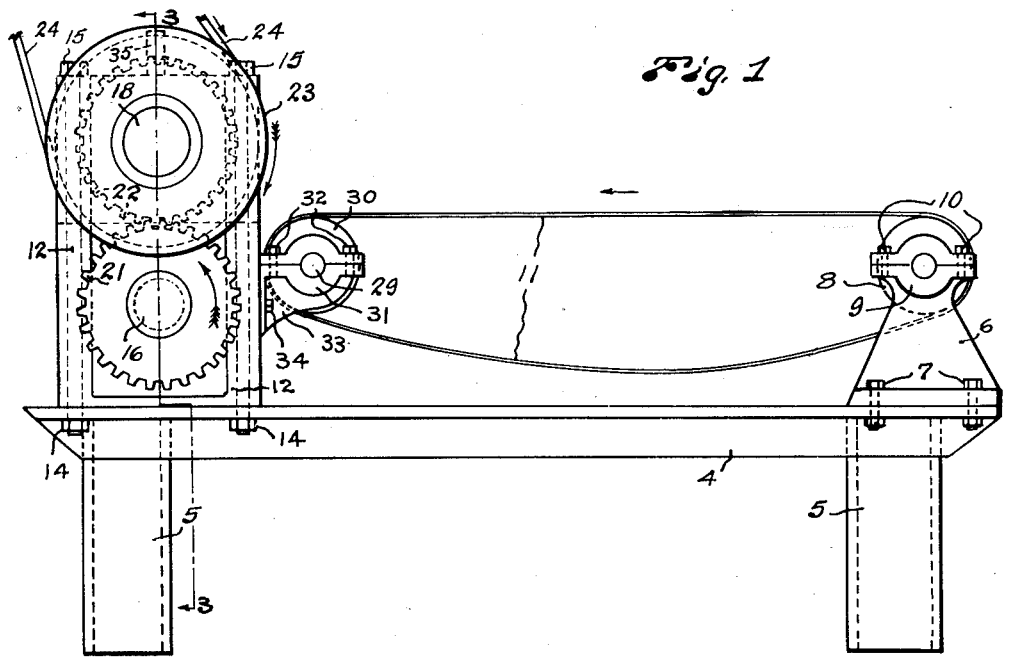
Figure 1 is a side elevation of a machine constructed in accordance with my invention.
Figure 2:
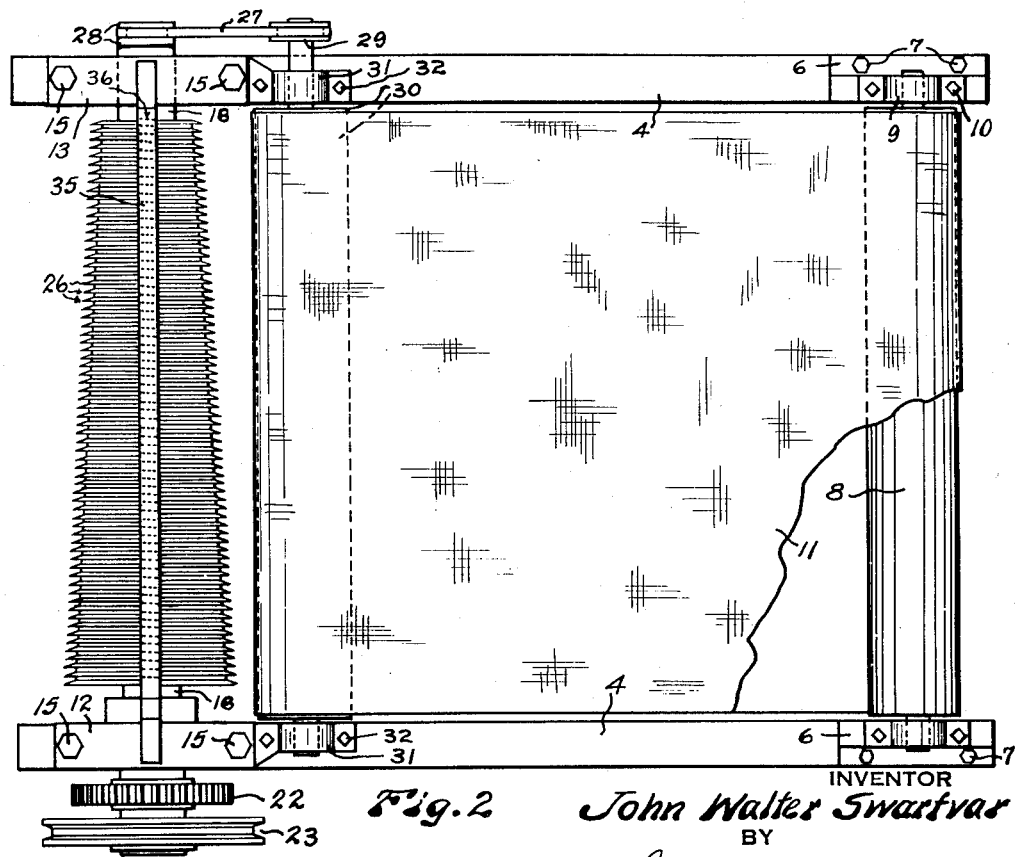
Fig. 2 is a plan view of the same.
Figure 3:
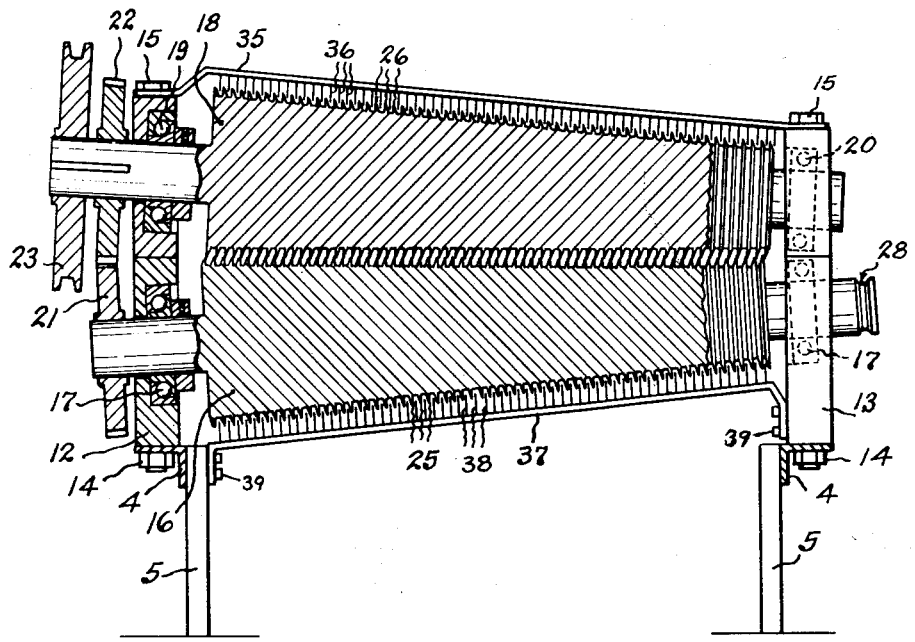
Fig. 3 is a view partially in section on line 3—3 of Fig. 1.

4 indicates an angular base member mounted upon suitable supporting members as legs 5. Bracket members 6 are secured on one end of base member 4 by suitable means as for example bolts 7. Roll 8 is journaled in bearings 9, the cap of which bearing is detachably secured by studs 10 to readily permit repairs. Endless feed belt 11 composed of canvas or similar material passes around and one end thereof is supported by roll 8. Bracket members 12 and 13 are secured to the other end of the angular base member 4 by suitable means as four bolts 15 and four nuts 14. Spindle 16 is journaled in suitable bearings as ball bearings 17, said ball bearings being mounted in bracket members 12 and 13 respectively, at the desired angle so that spindle 16 and spindle 18 will be in operative engagement. Spindle 18 is likewise journaled in suitable bearings 19 and 20 positioned in bracket members 12 and 13 respectively. Spindles 16 and 18 are operatively connected together for opposite rotation by intermeshing gears 21 and 22. Spindle 18 is connected to a source of power (not shown) by means of sheave 23 and endless belt 24. Spindles 16 and 18 are preferably made of solid tool steel with beveled cutting discs 25 and 26, which discs are cut in opposite directions. I have found that the diameter of the spindles 16 and 18 for cutting paper excelsior from scrap paper, as newspapers, which are ordinarily used for this purpose should change approximately one inch per one foot of length of the spindle. I wish it again expressly understood that my invention is not limited to requiring that the tapered spindles 16 and 18 be made of solid tool steel, or that the diameter change one inch to one foot of length, these dimensions and directions being set forth only to aid a user in one practical application and not in anywise as a limitation of the scope of my invention.

Endless belt 27 connects spindle 16 by sheave means 28 on or integral with spindle 16 and sheave means 29. Roll 30 with sheave means 29 on or integral therewith, is journaled in suitable bearings 31, the caps of which are detachably secured by studs 32 to readily permit repairs. Bearings 31 are mounted in bracket member 33 secured by suitable means as bolts 34 to bracket member 12. Arm 35 with wire brush members 36 is secured above spindle 18 by means of nuts 15. Secured below spindle 16 is a similar wire brush mechanism composed of arm 37 and wire brush members 38 secured by bolts 39.

Figure 4:
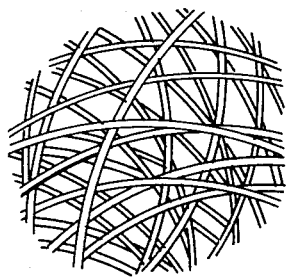
Fig. 4 is a plan view showing a pile of the finished product as it appears when delivered from the machine.

The raw material is fed on the belt and delivered to the spindles in the direction of movement of the parts as indicated by the arrows in Fig. 1. The tendency of my finished product to pack loosely is indicated by the pile thereof shown in Fig. 4.

Figure 5:
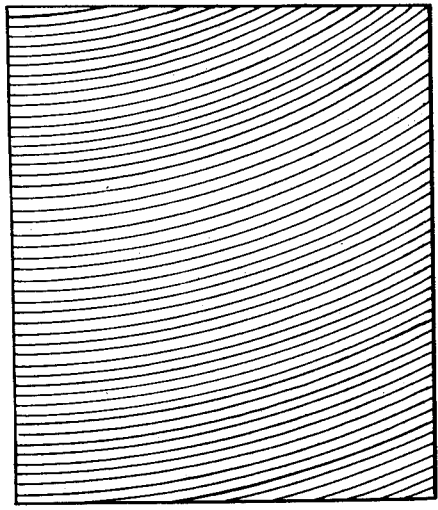
Fig. 5 shows the line of cutting of a sheet of material.

In the operation of my device the sheet material will be fed between two tapered spindles, the periferal speed of the cutting discs on the larger end being greater than the periferal speed of the cutting discs on the smaller end. This difference in periferal speed causes the sheet of material to turn while being fed through the spindles resulting in a series of arcuate cuts of the sheets fed through the spindles, as clearly shown in Fig. 5. As the strips are delivered from the cutter due to their shape and the twisting action of my tapered spindles on the sheets fed through the spindles, the product will fall and flutter to the pile below the machine in a mass which is irregular and non-uniform. As the curved members will be in all directions a series of holes will be formed in the pile, which will greatly exaggerate the cushioning effect of my product over the ordinary straight cut product.

Means may be also provided for the lateral adjustment of the spindles as wear has obtained upon the cutting discs and such adjustment is desirable, when cutting sheets of varying thickness, however, such means are well known in the art and they may or may not be used dependent upon the desire and needs of the user. For the making of a loose packing material, it has been found that a shredding action is obtained when the cutting discs are dull, therefore such discs require little sharpening in the first instance and seldom re-sharpening later.

Obviously, changes may be made in the forms, dimensions, and arrangement of the parts of my invention, without departing from the principle thereof, the above setting forth only preferred forms of embodiment.

I claim:

1. In a device of the character described, two tapered spindles operatively disposed with respect to each other having cutter knives disposed on their surfaces whereby arcuate shaped strips will be cut from sheet material passing through said rollers.

2. In a device of the character described, two tapered spindles operatively disposed with respect to each other having bevel shaped cutter knives with the cutting sides of the cutter knives in registration with each other whereby arcuate shaped strips will be cut from sheet material passing through said rollers.

3. In a device of the character described, two tapered spindles operatively disposed with respect to each other having cutter knives disposed on their surfaces whereby arcuate shaped strips will be cut from sheet material passing through said rollers and wire brushes operatively disposed with respect to said cutter knives.

4. A paper excelsior cutting device embodying two cutter heads of frusto-conical shape, each of the said cutter heads comprising a spindle and a plurality of cutter discs attached thereto, the discs of one cutter head being cooperatively disposed with the discs of the other cutter head.

JOHN WALTER SWARFVAR.